US012635025B2

(12) United States Patent
Liu

(10) Patent No.: US 12,635,025 B2
(45) Date of Patent: May 19, 2026

(54) COMMUNICATION METHOD, AND ELECTRONIC DEVICE

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 531 days.

(21) Appl. No.: 18/034,336

(22) PCT Filed: Nov. 2, 2020

(86) PCT No.: PCT/CN2020/125964
§ 371 (c)(1),
(2) Date: Apr. 27, 2023

(87) PCT Pub. No.: WO2022/088191
PCT Pub. Date: May 5, 2022

(65) Prior Publication Data
US 2024/0008124 A1     Jan. 4, 2024

(51) Int. Cl.
*H04W 76/20*     (2018.01)
*H04W 64/00*     (2009.01)
(52) U.S. Cl.
CPC ........... *H04W 76/20* (2018.02); *H04W 64/00* (2013.01)
(58) Field of Classification Search
None
See application file for complete search history.

(56) References Cited

U.S. PATENT DOCUMENTS

2022/0322429 A1*  10/2022  Zhu ................... H04W 74/0808
2023/0216612 A1*   7/2023  Wu ........................ H04L 1/1812
                                                         370/329

FOREIGN PATENT DOCUMENTS

CN           110099452 A       8/2019
CN           110506433 A      11/2019
WO      WO 2015123857 A1      8/2015

OTHER PUBLICATIONS

PCT/CN2020/125964, English translation of Search Report dated Aug. 2, 2021, 3 pages.
Chinese patent application No. 202080002928.7, Office Action dated Oct. 15, 2024, 7 pages.
Chinese patent application No. 202080002928.7, English translation of Office Action dated Oct. 15, 2024, 13 pages.

* cited by examiner

*Primary Examiner* — Suhail Khan
(74) *Attorney, Agent, or Firm* — Cozen O'Connor

(57) ABSTRACT

A wireless communication method and an electronic device. The wireless communication method includes: receiving first information, in which the first information includes at least one piece of first signal information, which is signal information acquired by one first device; determining idle channels based on the at least one piece of first signal information; and sending information based on the idle channels. The method may also include obtaining position information of the first device corresponding to each piece of first signal information, and determining the idle channels based on the at least one piece of first signal information includes determining target signal information from the at least one piece of first signal information based on position information of the sending device and position information of each first device and determining the idle channels based on the target signal information.

16 Claims, 3 Drawing Sheets

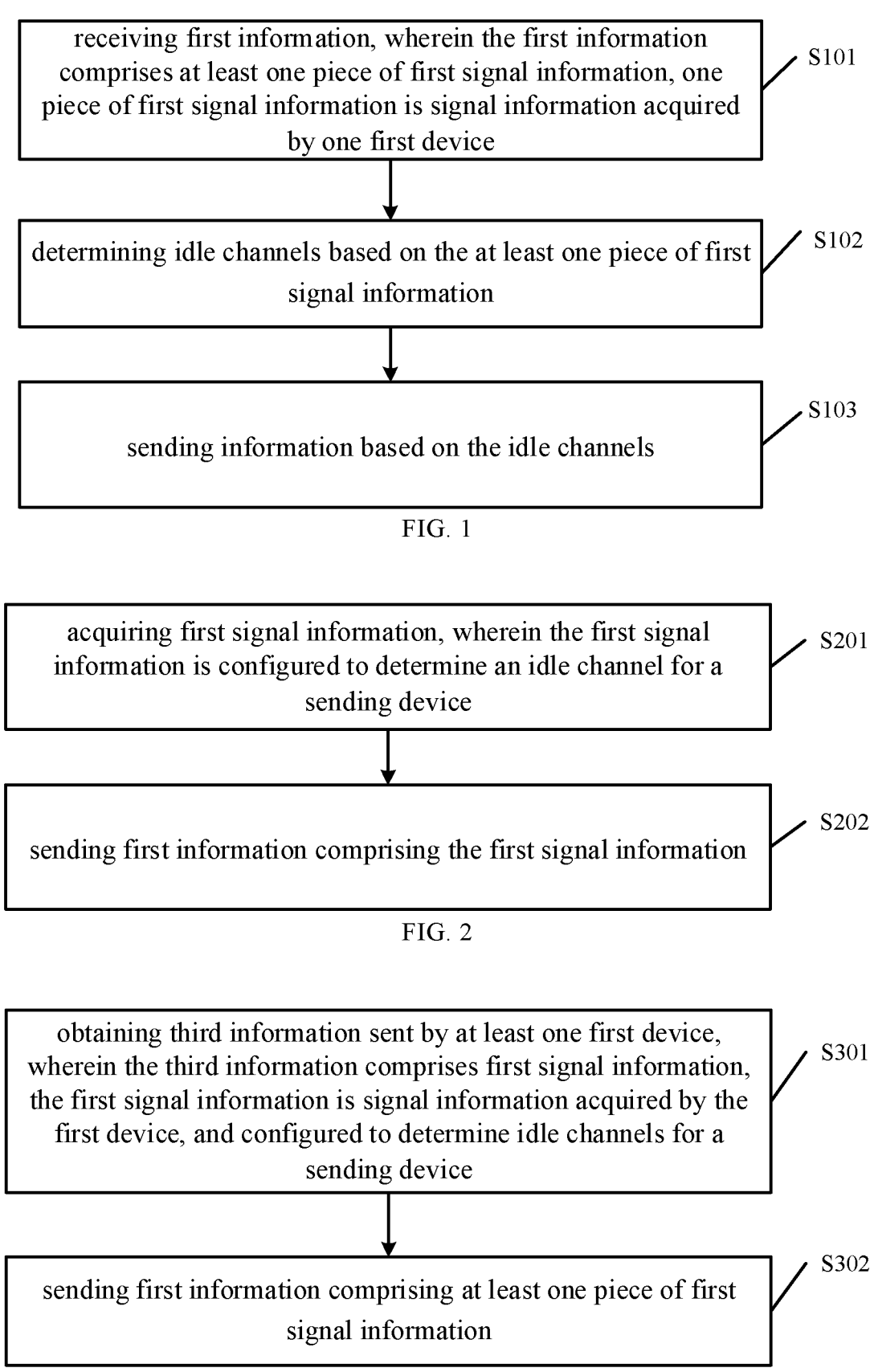

receiving first information, wherein the first information comprises at least one piece of first signal information, one piece of first signal information is signal information acquired by one first device

S101 determining idle channels based on the at least one piece of first signal information

S102 sending information based on the idle channels

S103

FIG. 1 acquiring first signal information, wherein the first signal information is configured to determine an idle channel for a sending device

S201 sending first information comprising the first signal information

S202

FIG. 2 obtaining third information sent by at least one first device, wherein the third information comprises first signal information, the first signal information is signal information acquired by the first device, and configured to determine idle channels for a sending device

S301 sending first information comprising at least one piece of first signal information

COMMUNICATION METHOD, AND ELECTRONIC DEVICE

CROSS REFERENCE TO RELATED APPLICATIONS

This application is a national phase application based on International Application No. PCT/CN2020/125964, filed Nov. 2, 2020, the entire content of which is incorporated by reference for all purposes.

TECHNICAL FIELD

The present disclosure relates to the field of wireless communication technologies, in particular to, a communication method, and an electronic device.

BACKGROUND

Radio spectrum resources are becoming increasingly scarce as large-scale use of wireless electronic devices increases. Techniques for using the spectrum resources more reasonably and efficiently is an important issue to be considered in the design of devices and networks for wireless communication.

The Listen Before Talk (LBT) feature, sometimes referred to as Listen Before Transmit (LBT) feature, is a technique used in the wireless communication. A radio transmitter first senses its radio environment before starting transmission. A radio device may search for a spectrum resource unoccupied by other devices by means of LBT. That is, the device first listens for a signal of a desired frequency/channel to check whether the frequency/channel is occupied by other devices. The frequency/channel will be used when it is determined that the frequency/channel is unoccupied by other devices.

SUMMARY

Embodiments of the present disclosure provide a communication method, and an electronic device.

According to a first aspect, an embodiment of the present disclosure provides a communication method, performed by a sending device. The method includes:

receiving first information, in which the first information includes at least one piece of first signal information, one piece of first signal information is signal information acquired by one first device;

determining idle channels based on the at least one piece of first signal information; and sending information based on the idle channels.

According to a second aspect, an embodiment of the present disclosure provides another communication method, performed by a first device. The method includes:

acquiring first signal information, in which the first signal information is configured to determine an idle channel for a sending device;

sending first information including the first signal information.

According to a third aspect, an embodiment of the present disclosure provides yet another communication method, performed by a second device. The method includes:

obtaining third information sent by at least one first device, in which the third information includes first signal information, the first signal information is signal information acquired by the first device, and configured to determine idle channels for a sending device; and sending first information including at least one piece of first signal information.

According to a fourth aspect, an embodiment of the present disclosure provides an electronic device. The electronic device includes a processor and a memory, coupled with each other.

The memory is configured to store a computer program; and

The processor is configured to implement the method provided by any one of possible implementations as described in at least one of a first aspect, a second aspect, and a third aspect when calling the computer program.

BRIEF DESCRIPTION OF THE DRAWINGS

In order to more clearly describe the technical solutions in embodiments of the present disclosure, the following briefly introduces the accompanying drawings required for describing the embodiments. Obviously, the accompanying drawings in the following description are only embodiments of the present disclosure. Other drawings can be obtained based on these drawings, for those skilled in the art, without inventive labor.

FIG. 1 is a flowchart illustrating a communication method according to an embodiment of the present disclosure.

FIG. 2 is a flowchart illustrating another communication method according to an embodiment of the present disclosure.

FIG. 3 is a flowchart illustrating yet another communication method according to an embodiment of the present disclosure.

DETAILED DESCRIPTION

Figure 4:
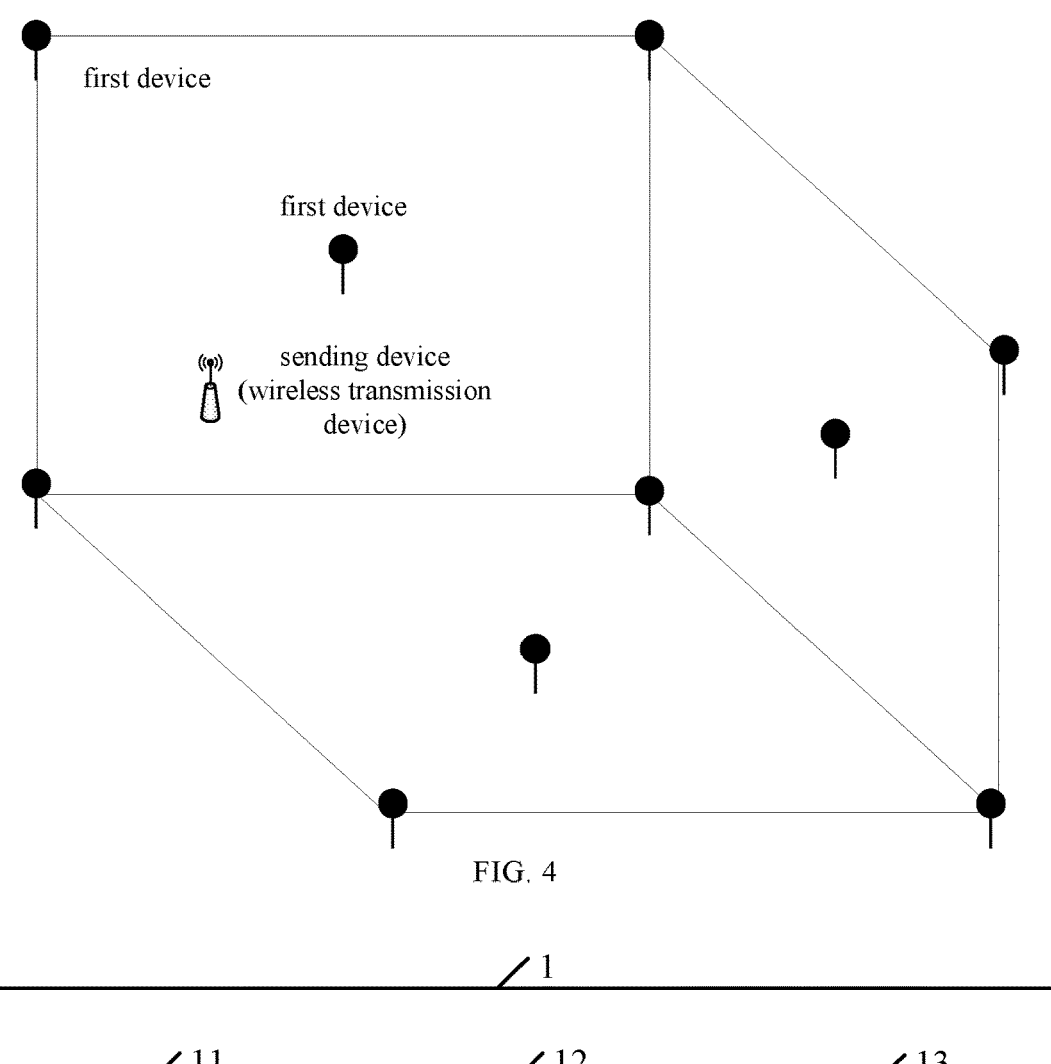
FIG. 4 is a schematic diagram illustrating a structure of a communication network according to an embodiment of the present disclosure.

Reference will be made clearly and completely in the technical solution of the embodiments of the disclosure with the accompanying drawings. Obviously, the embodiments described here are only part of the embodiments of the disclosure and are not all embodiments of the disclosure. Based on the embodiments of the disclosure, other embodiments obtained by those skilled in the art without inventive works are within the scope of the disclosure.

It should be noted that terms "first", "second", etc. in specification and claims of the present disclosure, as well as the accompanying drawings, are used to distinguish similar objects, without necessarily describing a specific order or sequence. It should be understood that data used in this way can be interchanged in an appropriate case, so that embodiments described herein can be implemented in orders other than those illustrated or described herein. In addition, terms "including" and "having", as well as any variations thereof, are intended to cover non-exclusive inclusion. For example, a process, a method, a product, or a device that includes a series of steps or units, need not be limited to those clearly listed steps or units, but may include other steps or units that are not clearly listed or inherent to the process, the method, the product, or the device.

Referring to FIG. 1, FIG. 1 is a flowchart illustrating a communication method according to an embodiment of the present disclosure. The method may be performed by any electronic device, especially any device to be sent information (referred to as a sending device). The information sent may be data, or may be control information, signaling, etc. A specific type of the information sent is not limited in embodiments of the present disclosure. The sending device may be a base station or a user equipment, or a radio device, or a wireless sending device, or other devices that require to send data. The present disclosure does not limit the specific type of the sending device.

As illustrated in FIG. 1, the communication method provided in an embodiment of the present disclosure may include the following steps.

At step S101, first information is received. The first information includes at least one piece of first signal information, and one piece of first signal information is signal information acquired by one first device.

At step S102, idle channels are determined based on the at least one piece of first signal information.

At step S103, information is sent based on the idle channels.

In a possible embodiment, the first signal information includes at least one of: a signal strength, a signal type, and a signal feature of a signal.

The first signal information may include a signal strength of a signal acquired. The signal strength is configured to characterize a degree of strength of the signal.

The first signal information may also include a signal type of the signal acquired, which may be a 5th generation mobile networks or 5th generation wireless systems or 5th-generation (abbreviated as 5G) signal, a 4th generation mobile communication technology (abbreviated as 4G) signal, or a 3rd generation telecommunication (abbreviated as 3G) signal, a 2-generation wireless telephone technology (abbreviated as 2G) signal, a wireless fidelity (abbreviated as Wi-Fi) signal, etc. Communication resources (such as a time domain resources and/or a frequency domain resource) occupied by different signal types are usually different. Therefore, signal types may be configured to estimate occupancy of the resource and accordingly configured to determine the idle channels, i.e. a channel resource.

The first signal information may also include a signal feature of the signal acquired. The signal feature is configured to represent feature information of the signal. For example, the acquired signal is one of synchronous signals in the 5G signal. The synchronous signal is a signal that provides a same time reference to machine equipment required to process information synchronously, and includes a plurality of signal sources emitted simultaneously from a same carrier. For another example, the signal feature may also include spreading code information of the signal. Spectrum information corresponding to a sending end of the first signal information may be determined based on the spreading code information.

It can be understood that the first signal information may include but is not limited to one or more of the signal strength, the signal type, and the signal feature listed above. Different signal information characterizes the features of the signal in different dimensions. The signal information may be configured to determine the idle channels, that is, which channel resources are currently unoccupied, and which information is specifically included in the first signal information, which will not be limited in embodiments of the present disclosure, as long as it is relevant signal information that can be configured to determine which channels are occupied and which channels are idle. The device to be sent information, that is, the sending device, may determine which channels are idle based on the first signal information received, and send the information based on the idle channels. It can be understood that an accuracy of the idle channels determined by the sending device is higher as information included in the first signal information is more, that is, the sending device may more accurately estimate which channels are possible to be idle.

An idle channel may also be referred to as an idle channel resource, a channel not occupied, a channel resource not occupied, an unoccupied channel, an unoccupied channel resource, a channel in an idle state, a channel resource in an idle state, etc. The channel resource may specifically be a time domain resource and/or a frequency domain resource, such as a spectrum resource occupied by a channel. The idle channels may be an idle channel set. The channel set may correspond to at least one channel.

The information may be understood as information to be sent by the sending device. The information may be data, or may be control information, signaling, etc. The specific type of the information to be sent is not limited in embodiments of the present disclosure.

The first device may also be understood as a receiver (or also referred to as a spectrum sensing point or a signal sensing point) capable of receiving signals. The first device is capable of receiving/acquiring signals surrounding the first device, that is, sensing spectrum usage surrounding the first device. The first device may transmit the first signal information sensed to the device to be sent information (i.e. the sending device). The first device may transmit the first signal information sensed to the sending device by means of wired or wireless transmission.

In practice, several first devices may be deployed within a certain space/region, and the first devices may receive/acquire signals within that space/region. Each first device may send the signal information acquired based on the first information, such as, in a broadcasting manner. The sending device to be sent information may receive the first information sent by these first devices, and determine the idle channels based on the signal information carried in the first information, and send the information based on the idle channels.

Optionally, times for respective first devices to send the first information may be the same or different. As an example, respective first devices may send according to a preset rule. For example, the times for respective first devices to send the first information are different, such as, a first device 1 sends first information at time point 1, a first device 2 sends first information at time point 2, and so on. For another example, respective first devices may send at an agreed time interval. Of course, in response to the first device not acquiring new signal information within a certain time interval, the first device may not send first information at a sending time point corresponding to the time interval, or send first information which may be the first information sent in the previous time interval.

For those skilled in the art, it is clear that in practice, for sending of information, the information is generally sent after encoded. Correspondingly, after receiving the first information, the sending device may decode the first information in a corresponding decoding manner to obtain a content included in the first information.

It should be noted that names of various related information in an embodiment of the present disclosure are only illustrative and not unique, and may also use other names. Similarly, the expression of the idle channel is not limited in an embodiment of the present disclosure.

According to the communication method provided in an embodiment of the present disclosure, the sending device may determine the idle channels based on the first signal information received before sending the information, and send the information based on the idle channels. Based on the method, the sending device may effectively improve an efficiency of information sending without excessive channel monitoring or channel search before sending the information. Further, this solution may effectively improve a utilization rate of the communication resource and reduce occurrence of resource usage conflicts.

In an optional embodiment, the step S101, namely receiving the first information, may include:

receiving broadcast information carrying the first information.

Optionally, the sending device may obtain the first information carried in the broadcast information by receiving the broadcast information. The use of broadcasting may effectively ensure reception of the first information by the sending device, such that the first information may be received by the sending device within the corresponding space/region as much as possible.

In an optional embodiment, the step S101, namely receiving the first information, may include any one of:

receiving the first information sent by at least one first device; or receiving the first information sent by a second device, in which the first information is sent by the at least one first device to the second device.

Optionally, the sending device may receive the first information by directly receiving the first information sent by the at least one first device. Alternatively, the at least one first device may send the first information to the second device, and then the sending device receives the first information sent by the second device. In other words, each first device that acquires the first signal information may directly send the signal information acquired to the sending device, such as, in a broadcasting manner. Alternatively, each first device may send the signal information acquired to the second device, such that the signal information is sent by the second device together, for example, the second device may send the first signal information received from each first device to the sending device in form of broadcasting. Correspondingly, the first information received by the sending device may be either sent by the first device or sent by the second device.

In an optional embodiment, receiving the first information sent by the at least one first device includes:

receiving broadcast information sent by each of the at least one first device through a broadcast subchannel corresponding to each first device, in which the broadcast information carries the first information.

The broadcast information may be transmitted at a certain power to ensure that all devices in a specific space (i.e. devices to be sent information) can receive the broadcast information.

Optionally, for the first device, each first device has its own corresponding broadcast subchannel. Each first device may send the broadcast information through broadcast subchannel corresponding to the first device, and the sending device may receive the broadcast information broadcasted by the at least one first device, and further obtain the first information carried in the broadcast information. The specific space may be understood as a room, a community, a building, a shopping mall, etc., which will not be limited herein.

According to an embodiment of the present disclosure, the sending device may obtain the first information by receiving the broadcast information, and further obtain the first signal information, and then determine the idle channels based on the first signal information, thus avoiding the existing method of determine the idle channels by searching a plurality of channels or even all channels within a specific spectrum. Therefore, efficiency of determining the idle channels may be improved and the utilization rate of the channel resource may further be improved.

In an optional embodiment, receiving the first information sent by the at least one first device may include at least one of:

receiving the first information sent by the at least one first device through a broadcast channel, in which the broadcast channel is a broadcast channel for sending the first information and corresponding to all first devices; or receiving the first information sent by each of the at least one first device through the broadcast subchannel corresponding to each of the at least one first device:

Optionally, the sending device may receive the first information sent by each of at least one first device through the broadcast channel. The broadcast channel is a broadcast channel for all first devices to send the first information. That is, the sending device may receive the first information through the broadcast channel.

Optionally, the broadcast channel may be a single channel or a plurality of subchannels. For the solution that the first signal information is sent by the second device together, the broadcast channel may be a single channel through which the second device sends the first information. For the solution that each first device sends the signal information acquired by each device itself, the broadcast channel may include subchannels corresponding to respective first devices.

The broadcast channel may be a pre-divided channel. The broadcast channel may be multiplexed by all first devices. The multiplexing may be spectrum multiplexing, time division multiplexing, or code division multiplexing, etc., which will not be limited herein.

Optionally, the sending device may also receive the first information through at least one broadcast subchannel corresponding to the at least one first device respectively.

In an embodiment of the present disclosure, the sending device may receive the first information through the broadcast channel or the broadcast subchannels, which may improve flexibility of receiving the first information.

In an optional embodiment, the above method may be performed by the sending device. Receiving the first information sent by each of the at least one first device through the broadcast subchannel corresponding to each of the at least one first device may include:

obtaining position information corresponding to each first device;

determining at least one target first device based on position information of the sending device and the position information corresponding to each first device; and receiving the first information sent by each of the at least one target first device based on a broadcast subchannel corresponding to each of the at least one target first device determined.

Optionally, the position information may be horizontal, longitudinal, and vertical coordinates of the first device and the sending device in a same three-dimensional coordinate system.

The sending device may obtain the position information of each first device. There are various ways to obtain the position information of the first device, such as including the following two methods.

Method 1: when the first device may send the position information together with sending the first information. For example, the first device may independently send the position information to the sending device. Alternatively, the first information may include the position information of the first device, and the first device may send the signal information acquired and its position information together to the sending device or the second device.

Method 2: In practice, for the position information of the first device, the sending device may pre-know the position information of each first device (that is, the position information of each first device is fixed, and the sending device and the second device can be pre-known). The sending device may directly obtain the position information of the first device without a need for the first device to send the position information again. When receiving the first information sent by the first device, the sending device may directly determine the position information of the first device based on an identifier of the first device. For example, the sending device may obtain the position information of the first device by querying a table based on the identifier of the first device.

It is understandable that the above example is only illustrative, and this embodiment is not limited herein.

After obtaining the position information of each first device according to the above method, the at least one target first device in the first devices may be determined based on the position information of the sending device and the position information of each first device according to actual needs. Then, the first information sent by the at least one target first device may be received through the at least one broadcast subchannel corresponding to the at least one target first device determined, respectively.

Optionally, the at least one target first device may be at least one first device that is relatively close to the sending device, such as devices in the front, back, left, right, up, down, and other positions of the sending device. For example, at least one first device within a predetermined distance threshold from the sending device may be determined as the at least one target first device based on the position information of the sending device and the position information of each first device, which is within the set distance threshold from the sending device. Alternatively, a predetermined number of first devices with smaller distances from the sending device may be determined as the target first devices based on a distance between each first device and the sending device. Understandably, there are no limitations on how to determine the target first device based on the position information.

In an embodiment of the present disclosure, in order to meet practical requirements, some target first devices in the first devices may be determined based on the position information, and then the first information of the at least one target first device may be received, that is, the first information may be received as actual required, which may increase flexibility, reduce the amount of information received by the sending device, and reduce computational burden of determining the idle channels based on the first information, thus reducing power consumption of the sending device.

In an optional embodiment, the above method may be performed by the sending device. The method further includes:

obtaining position information of a first device corresponding to each piece of first signal information;

in which determining the idle channels based on the at least one piece of first signal information includes:

determining target signal information from the at least one piece of first signal information based on position information of the sending device and position information of each first device; and determining the idle channels based on the target signal information.

Optionally, obtaining the position information of the first device corresponding to each piece of first signal information may refer to the previous description, and is not limited herein.

After obtaining the position information of each first device, the target signal information in the at least one piece of first signal information may be determined based on the position information of the sending device and the position information of each first device as actual required, and then the idle channels may be determined based on the target signal information determined.

The first device corresponding to each of at least one piece of target first signal information may be a first device that are relatively close to the sending device, such as devices in the front, back, left, right, up, down, and other positions of the sending device. For example, each first device within a predetermined distance threshold from the sending device may be determined as the first device corresponding to each of at least one piece of target first signal information based on the position information of the sending device and the position information of each first device, which is within the set distance threshold from the sending device. Alternatively, each of a predetermined number of first devices with smaller distances from the sending device may be determined as the first device corresponding to each of at least one piece of target first signal information based on a distance between each first device and the sending device.

In an optional embodiment, the first information further includes the position information of the first device corresponding to each piece of first signal information.

Optionally, the first information may include both of at least one first signal information and the position information of the first device corresponding to each piece of first signal information.

In an optional embodiment, sending the information based on the idle channels includes:

determining a target channel from the idle channels;

sending the information based on the target channel.

Optionally, any one channel may be selected from the idle channels indicated by the first information. A specific implementation of selecting one channel from the idle channels will not be limited in an embodiment of the present disclosure.

For example, in an optional embodiment, selecting one channel from the idle channels includes randomly selecting one channel from the idle channels.

The specific implementation of selecting one channel from the idle channels may be randomly selecting one channel from the idle channels indicated by the first information.

In an optional embodiment, determining the target channel from the idle channels includes:

selecting one channel from the idle channels;

determining the channel selected as the target channel in response to the channel selected being unoccupied.

Optionally, in practice, in order to avoid a resource conflict between different sending devices, one sending device is required to determine whether the channel selected is idle or not occupied by other devices before sending the information. Therefore, before sending the information through the channel selected, the sending device may first determine whether the channel selected is occupied, and may send the information through the channel in response to the channel being unoccupied, which may avoid failure of information sending due to the resource conflict.

A specific implementation for determining whether the channel is occupied may employ any existing method for determining whether the channel is occupied, which will not be limited in an embodiment of the present disclosure. For example, any electronic device may send information through broadcasting to inform other devices that the electronic device has already occupied a certain channel or channel resource when the electronic device is required to send information by using the channel or channel resource. As such, other devices may know which channel or channel resource is occupied by the electronic device based on the information.

After selecting one channel from idle channels, the channel selected may be determined as the target channel for sending information in response to the channel selected being unoccupied.

According to the solution provided by an embodiment of the present disclosure, the idle channels are determined based on the at least one piece of signal information included in the first information received, and then the information is sent based on the idle channels, thus avoiding the existing method of searching a plurality of channels or even all channels within a specific spectrum to determine the idle channels. Therefore, efficiency of determining the idle channels may be improved and the utilization rate of the channel resource may further be improved.

In a case where the channel selected is occupied, there are two alternative ways to solve it.

In an optional embodiment, the method further includes:

receiving second information in response to the channel selected being occupied, in which the second information includes at least one piece of second signal information, one second signal information is signal information acquired by one first device;

determining an idle channel based on at least one second signal information;

sending the information based on the idle channel.

Optionally, when the channel selected is occupied by another device, the second information may be received, and the idle channel may be re-determined based on the at least one piece of second signal information included in the second information. It can be understood that essence of the second information and the first information is the same, both of which are information configured to indicate the idle channel, but differ in their reception occasions. Optionally, the second information may also be referred to as second indication information or the like.

In practice, occupancy of a channel may change at any time. When the channel selected is occupied, in order to ensure real-time of information obtained, the sending device may receive the second information again and determine the idle channels based on the second signal information includes in the second information received again, and then send the information based on the idle channel determined again. The method of determining the idle channel based on the second signal information included in the second information and sending the information based on the idle channel determined again is the same as the method of determining the idle channels based on the first signal information included in the first information and sending the information based on the idle channels determined, which will not be repeated herein.

An implementation of determining the idle channel based on the second signal information included in the second information, and selecting the channel to be sent information based on the idle channel determined again may refer to the foregoing description, such as selecting one channel in a random selection manner to send information to be sent.

It should be noted that when an occupied situation is still occurred under determining the idle channel based on the second signal information included in the second information, and sending the information based on the idle channel determined again, the above process may be re-executed, that is, when the channel selected is occupied, information including the signal information may be received again, and the idle channel may be determined based on the information including the signal information that is received again, and the information may be send.

According to this embodiment, when the channel selected is occupied, the new second information may be received again, and the idle channel may be determined based on the second signal information included in the second information, and then the information may be sent based on the idle channel determined again. Therefore, a situation where the information cannot be sent or fails to be sent due to the channel selected being occupied may be avoided. Moreover, since the second signal information included in the second information is new signal information, a new idle channel may be determined, selecting a channel from the new idle channel to send the information may improve a success rate of sending information.

In an optional embodiment, the method further includes:

re-selecting one channel from the idle channels other than the channel selected, in response to the channel selected being occupied;

in which sending the information based on the idle channels includes:

sending the information based on the channel re-selected.

As an alternative, when the channel selected is occupied by another device to be sent information, one channel which is not the channel having already selected may be selected from the idle channels. An implementation of selecting one channel from the idle channels other than the channel selected is not limited herein, such as selecting one channel in a random selection manner to send information to be sent.

As an example, assume that there are 10 idle channels determined, namely channel 1, channel 2, channel 3 . . . channel 10. A channel selected for the first time is channel 3. When sending the information based on channel 3, and channel 3 is found to be occupied, another channel may be selected from the remaining 9 channels except for channel 3, for example, channel 6 is selected, the information may be sent based on channel 6.

It is understandable that the above example is only illustrative, which will not be limited in this embodiment.

The information is sent based on the channel re-selected from the idle channels other than the occupied channel. For example, the information may be sent through channel 6. Of course, in response to the channel re-selected is also occupied, another idle channel may be re-selected, or information including the signal information may be received again and the idle channel is determined again, and the information may be sent based on the idle channel determined again.

According to this embodiment, when a situation where the channel selected is occupied occurs, one channel may be selected from the idle channels other than the selected channel to send information. Therefore, failure to send the information due to the channel selected being occupied may be avoided, and a success rate of sending the information may be improved.

It should be noted that the two alternative embodiments when the channel selected is occupied provided in the present disclosure may be implemented separately or in combination. For example, a threshold for the number of repeated selections may be set. In response to the number for consecutive repeated selections of the idle channels being greater than or equal to the threshold, receiving the information included the signal information again, determining the idle channel based on the signal information, and sending the information based on the idle channel determined again may be performed. In response to the number for consecutive repeated selections of the idle channels being less than or equal to the threshold, the steps of re-selecting the idle channel may be performed, and the information is sent based on the idle channel re-selected. For example, a time threshold may be set. In response to a time difference between a current time point and a time point when the first information is received being greater than or equal to the time threshold, it is required to receive the information included the signal information again, determine the idle channel based on the information included the signal information that is received again, and send the information based on the idle channel determined again. In response to the time difference between the current time point and the time point when the first information is received being less than or equal to the time threshold, one channel may be re-selected from the idle channels other than channels already occupied by other devices, and the information is sent based on the channel re-selected.

Referring to FIG. 2, FIG. 2 is a flowchart illustrating another communication method according to an embodiment of the present disclosure. As illustrated in FIG. 2, the method may be performed by a first device, mainly include the following steps.

At step S201, first signal information is acquired. The first signal information is configured to determine an idle channel for a sending device.

At step S202, first information is sent. The first information includes the first signal information.

In an optional embodiment, sending the first information includes broadcasting the first information.

Referring to FIG. 3, FIG. 3 is a flowchart illustrating yet another communication method according to an embodiment of the present disclosure. As illustrated in FIG. 3, the method may be performed by a second device, mainly include the following steps.

At step S301, third information sent by at least one first device is obtained. The third information includes first signal information, the first signal information is signal information acquired by the first device, and configured to determine idle channels for a sending device.

At step S302, first information is sent. The first information includes at least one piece of first signal information.

In an optional embodiment, sending the first information includes broadcasting the first information.

The communication methods illustrated in FIG. 2 and FIG. 3 and corresponding optional embodiments are described from perspectives of different execution subject matters. It can be understood that the content in FIG. 1, FIG. 2 and FIG. 3 may be referenced with each other. For example, explanation or description of the meaning of the same technology may be referred, and many steps are also described from different perspectives. Therefore, the explanation of each optional embodiment corresponding to the communication method in FIG. 2 or FIG. 3 may refer to the previous description of each optional embodiment of the method illustrated in FIG. 1, and will not be repeated herein.

In an optional embodiment, the present disclosure also provides a communication network. The communication network includes several first devices.

Each of first devices of configured to acquire first signal information and send first information. The first signal information is configured to determine an idle channel for a sending device, and the first information comprises the first signal information.

As an example, FIG. 4 is a schematic diagram illustrating a structure of a communication network according to an embodiment of the present disclosure. As illustrated in FIG. 4, the network includes several first devices and a wireless transmission device.

As illustrated in FIG. 4, it can be seen that the network includes at least one first device. The first devices in FIG. 4 are located at respective positions, such as, a center point, an upper left corner, an upper right corner, a lower left corner, a lower right corner, and other positions. In practice, the positions of the first devices are not limited herein.

The implementation steps for each device in the above communication network are as follows.

Step 1: Before using a spectrum resource, a spectrum sensing network (i.e., the above communication network) is first laid out, a plurality of points in a space corresponding to the communication network are selected, and receivers (i.e., the above first devices) are placed. The receiver may also be referred to as a spectrum sensing point.

Step 2: The receivers sense spectrum usage of the surroundings.

Step 3: For each receiver, a signal received by the receiver may be encoded and then broadcasted on a specific sub-channel belonging to the receiver in a pre-allocated broadcast channel (the broadcast channel is multiplexed by all receivers. Such multiplexing may be spectrum multiplexing, time division multiplexing, or code division multiplexing, etc.). The broadcast information may also include position information of the receiver, and the position information includes horizontal, longitudinal, and vertical coordinates of the receiver in a three-dimensional coordinate system. The broadcast information may also include signal information received (such as a signal strength, a signal type, a signal feature, etc.). The broadcast signal is transmitted at a certain power to ensure that all devices in a specific space can receive the broadcast information.

Step 4: A device desired to perform wireless transmission (such as the wireless transmission device in FIG. 4, which is the sending device to be sent information) receives sensing information (i.e., the broadcast information) of each receiver. The wireless transmission device may receive signals from the entire broadcast channel, the wireless transmission device may alternatively receive signals from a proportion of receivers in the broadcast channel (i.e., information from subchannels) as required.

Step 5: The wireless transmission device desired to use spectrum calculates the sensing information (i.e., broadcast information) to obtain an available spectrum resource of the device. The calculation process includes the followings.

1) Coordinates of the device are determined based on the signal strengths of the signal information sent by the receivers on the broadcast subchannels and the coordinates of the receivers.

2) Receivers located closest to the device at a plurality of positions including front, rear, left, right, top and bottom, respectively, are searched, and signals that are not being used by other devices, which is a set, are searched based on the signals received by the receivers on these positions.

3) The wireless transmission device randomly selects one channel corresponding to one signal in a signal set that are not used by other devices for transmission.

Step 6: The wireless transmission device uses the spectrum resource calculated. In response the spectrum resource being occupied by another device, the process of steps 4 to 6 are repeated.

According to an embodiment of the present disclosure, the spectrum sensing network (i.e., the aforementioned communication network) senses the spectrum usage in an environment and broadcasts the signal sensed through the broadcast channel. Before using a certain spectrum resource, a device to be sent the information receives broadcasting of usage of the surrounding signals received by the sensing point (i.e., the receiver) of the sensing network, calculates the spectrum usage within a certain space, and then determines the use of idle spectrum resource by the device. When large-scale wireless devices are used simultaneously, the present disclosure read the broadcast channel, without necessary to search for a plurality of channels, causing more efficiently and reasonably usage of the wireless resource by the plurality of devices.

Figure 5:
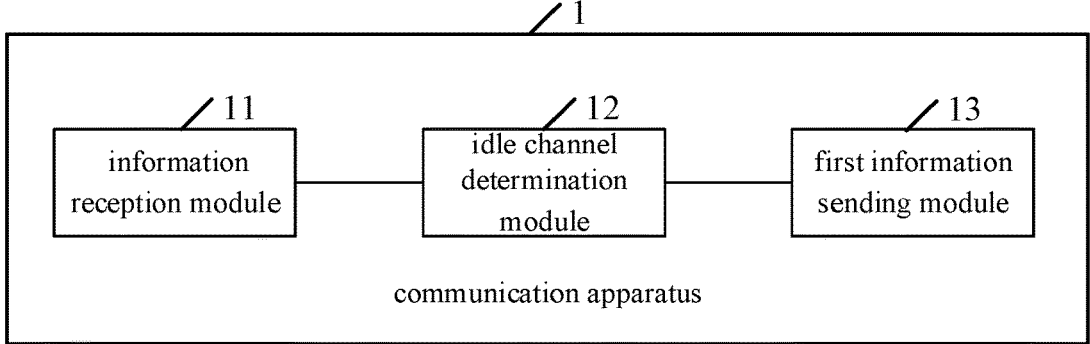
FIG. 5 is a schematic diagram illustrating a structure of a communication apparatus according to an embodiment of the present disclosure.

Referring to FIG. 5, FIG. 5 is a schematic diagram illustrating a structure of a communication apparatus according to an embodiment of the present disclosure. The communication apparatus 1 provided in an embodiment of the present disclosure includes:

an information reception module 11, configured to receive first information, in which the first information includes at least one piece of first signal information, one piece of first signal information is signal information acquired by one first device;

an idle channel determination module 12, configured to determine idle channels based on the at least one piece of first signal information; and a first information sending module 13, configured to send information based on the idle channels.

According to an embodiment of the present disclosure, the idle channels are determined based on the at least one piece of signal information included in the first information received, and then the information is sent based on the idle channels, thus avoiding the existing method of searching a plurality of channels or even all channels within a specific spectrum to determine the idle channels, and directly determining the idle channels based on the at least one first signal information included in the first information. Therefore, efficiency of determining the idle channels may be improved and the utilization rate of the channel resource may further be improved.

In some possible embodiments, the information reception module is configured to:

obtain position information of a first device corresponding to each piece of first signal information;

in which determining the idle channels based on the at least one piece of first signal information includes:

determining target signal information from the at least one piece of first signal information based on position information of the sending device and position information of each first device; and determining the idle channels based on the target signal information.

In some possible embodiments, the first information further includes the position information of the first device corresponding to each piece of first signal information.

In some possible embodiments, the information reception module is configured to:

receive broadcast information carrying the first information.

In some possible embodiments, the information reception module is configured to perform any one of:

receiving the first information sent by at least one first device; or receiving the first information sent by a second device, in which the first information is sent by the at least one first device to the second device.

In some possible embodiments, the information reception module is configured to:

receive broadcast information sent by each of the at least one first device through a broadcast subchannel corresponding to each first device, in which the broadcast information carries the first information.

In some possible embodiments, the information reception module is configured to perform at least one of:

receiving the first information sent by the at least one first device through a broadcast channel, in which the broadcast channel is a broadcast channel for sending the first information and corresponding to all first devices; or receiving the first information sent by each of the at least one first device through the broadcast subchannel corresponding to each of the at least one first device.

In some possible embodiments, the information reception module is configured to:

obtain position information corresponding to each first device;

determine at least one target first device based on position information of the sending device and the position information corresponding to each first device; and receive the first information sent by each of the at least one target first device based on a broadcast subchannel corresponding to each of the at least one target first device determined.

In some possible embodiments, the first information sending module is configured to:

determine a target channel from the idle channels;

send the information based on the target channel.

In some possible embodiments, the first information sending module is configured to:

select one channel from the idle channels;

determine the channel selected as the target channel in response to the channel selected being unoccupied.

In some possible embodiments, the first information sending module is configured to:

randomly select one channel from the idle channels.

In some possible embodiments, the first information sending module is configured to:

receive second information in response to the channel selected being occupied, in which the second information includes at least one piece of second signal information, one second signal information is signal information acquired by one first device;

determine an idle channel based on at least one second signal information;

send the information based on the idle channel.

In some possible embodiments, the first information sending module is configured to: re-selecting one channel from the idle channels other than the channel selected, in response to the channel selected being occupied;

in which sending the information based on the idle channels includes:

sending the information based on the channel re-selected.

In some possible embodiments, the first signal information includes at least one of:

a signal strength, a signal type, and a signal feature of a signal.

Figure 6:
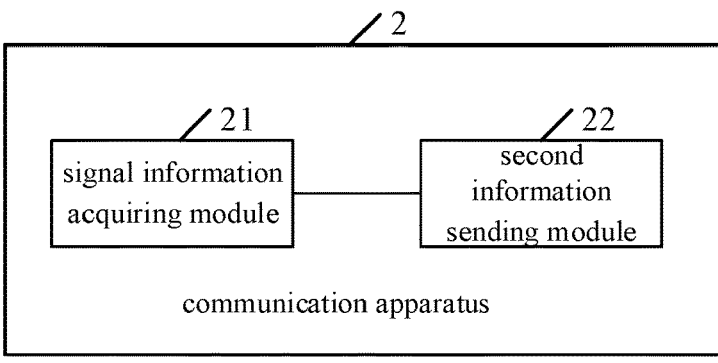
FIG. 6 is a schematic diagram illustrating a structure of another communication apparatus according to an embodiment of the present disclosure.

Referring to FIG. 6, FIG. 6 is a schematic diagram illustrating a structure of a communication apparatus according to an embodiment of the present disclosure. The communication apparatus 2 provided in an embodiment of the present disclosure may be applicable for a first device. The communication apparatus 2 includes:

a signal information acquiring module 21, configured to acquire first signal information, in which the first signal information is configured to determine an idle channel for a sending device; and a second information sending module 22, configured to send first information including the first signal information.

In some possible embodiments, the second information sending module is configured to:

broadcast the first information.

Figure 7:
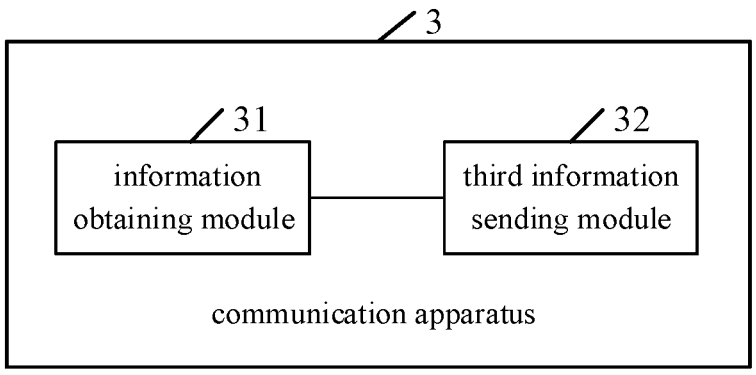
FIG. 7 is a schematic diagram illustrating a structure of yet another communication apparatus according to an embodiment of the present disclosure.

Referring to FIG. 7, FIG. 7 is a schematic diagram illustrating a structure of a communication apparatus according to an embodiment of the present disclosure. The communication apparatus 3 provided in an embodiment of the present disclosure may be applicable for a second device. The communication apparatus 3 includes:

an information obtaining module 31, configured to obtain third information sent by at least one first device, in which the third information includes first signal information, the first signal information is signal information acquired by the first device, and configured to determine idle channels for a sending device; and a third information sending module 32, configured to send first information including at least one piece of first signal information.

In the specific implementation, the apparatus 1 may execute an implementation provided by the steps as described in FIG. 1 by its built-in functional modules, the apparatus 2 may execute an implementation provided by the steps as described in FIG. 2 by its built-in functional modules, and the apparatus 3 may execute an implementation provided by the steps as described in FIG. 3 by its built-in functional modules. The details may refer to the implementation provided by any one of the foregoing steps, and will not be repeated herein.

Figure 8:
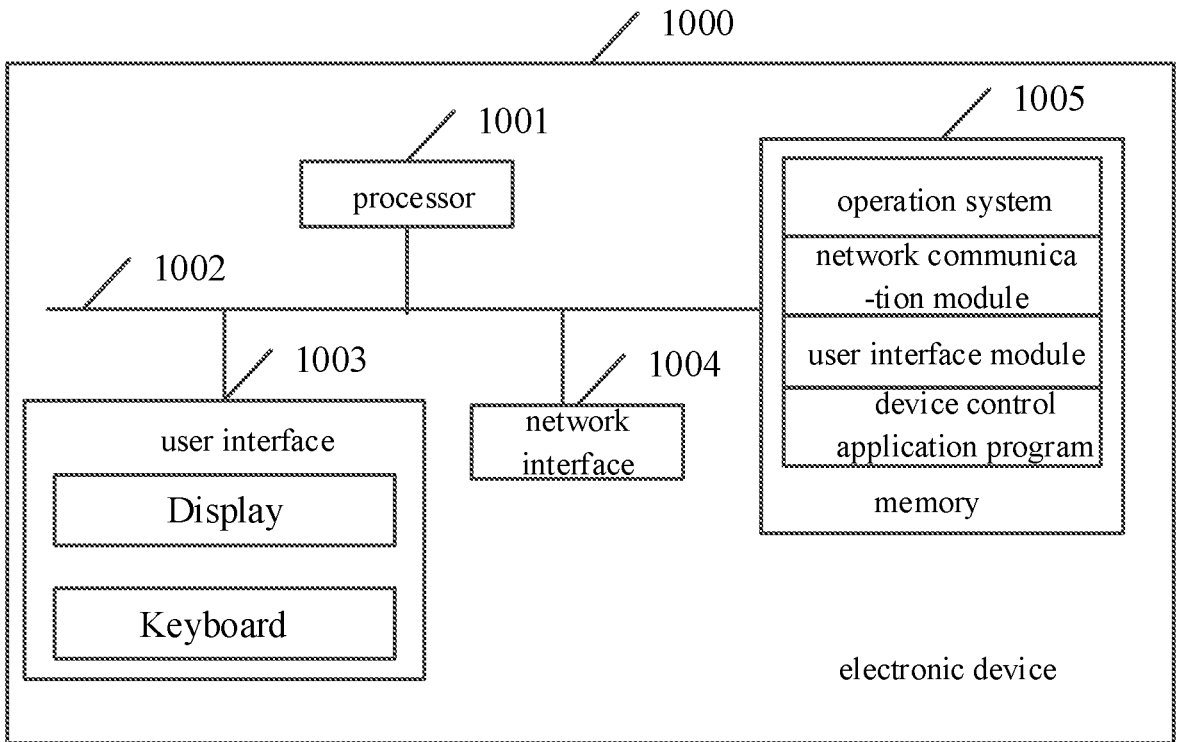
FIG. 8 is a schematic diagram illustrating a structure of an electronic device according to an embodiment of the present disclosure.

Referring to FIG. 8, FIG. 8 is a schematic diagram illustrating an electronic device according to an embodiment of the disclosure. As illustrated in FIG. 8, an electronic device 100 in this embodiment may include a processor 1001, a network interface 1004, and a memory 1005. In addition, the electronic device 1000 may also include: a user interface 1003, and at least one communication bus 1002.

The communication bus 1002 is used to achieve connection communication between these components. The user interface 1003 may include a display and a keyboard, and the user interface 1003 may optionally include a standard wired interface and a standard wireless interface. The network interface 1004 may optionally include standard wired interface and a standard wireless interface (such as a WI-FI interface). The memory 1005 may be a high-speed RAM (random access memory) memory or a non-volatile memory, such as at least one disk storage. The memory 1005 may optionally be at least one storage device located away from the aforementioned processor 1001. As illustrated in FIG. 8, the memory 1005, as a computer-readable storage medium, may include an operation system, a network communication module, a user interface module, and a device control application program.

In the electronic device 1000 illustrated in FIG. 8, the network interface 1004 may provide a network communication function. The user interface 1003 is mainly configured to provide an input interface for a user. The processor 1001 may be configured to call the device control application program stored in memory 1005 to implement the followings.

In some possible embodiments, the processor 1001 is configured to:

receive first information, in which the first information includes at least one piece of first signal information, one piece of first signal information is signal information acquired by one first device;

determine idle channels based on the at least one piece of first signal information; and send information based on the idle channels.

It should be understood that in some possible embodiments, the processor 1001 may be a central processing unit (CPU), and may also be any other general-purpose processor, a digital signal processor (DSP), an application specific integrated circuits (ASIC), a field-programmable gate array (FPGA) or any other programmable logic device, a discrete gate or transistor logic device, a discrete hardware component, etc. A general-purpose processor may be a microprocessor or any conventional processor. The memory may include a read-only memory and a random access memory, and provide instructions and data to the processor. A part of the memory may also include the non-volatile random access memory. For example, the memory may also store information about device types.

In the specific implementation, the above electronic device 1000 may execute the implementation provided by the steps as described in any one of FIG. 1, FIG. 2, and FIG. 3 by its built-in functional modules. The details may refer to the implementation provided by any one of the foregoing steps, and will not be repeated herein.

An embodiment of the present disclosure also provides a computer readable storage medium having a computer program stored thereon. The computer program is caused to implement the method provided by the steps as described in any one of FIG. 1, FIG. 2, and FIG. 3 when executed by a processor. The details may refer to the implementation provided by any one of the foregoing steps, and will not be repeated herein.

The above computer readable storage medium may be an internal storage unit of a task processing device provided by any one of the foregoing embodiments, such as a hard disk or a memory of an electronic device. The computer readable storage medium may also be an external storage device of the electronic device, such as a plug-in hard disk, a smart media card (SMC), a secure digital (SD) card, a flash card, etc. provided with the electronic device. The above computer readable storage media may also include a magnetic disk, an optical disc, a read-only memory (ROM) or a random access memory (RAM), etc. Furthermore, the computer readable storage medium may include both the internal storage unit of the electronic device and the external storage device. The computer readable storage medium is configured to store a computer program and other programs and data required by the electronic device. The computer readable storage medium may also be configured to temporarily store data that has been or is to be output.

An embodiment of the present disclosure provides a computer program product or a computer program, which includes computer instructions stored on a computer readable storage medium. A processor of an electronic device reads the computer instructions from the computer readable storage medium, and the processor executes the computer instructions causing the computer device to implement the method provided by the steps as described in any one of FIG. 1, FIG. 2, and FIG. 3.

The terms "first", "second", etc. in specification and claims of the present disclosure, as well as the accompanying drawings, are used to distinguish similar objects, rather than to describe a specific order. In addition, the "including" and "having", as well as any variations thereof, are intended to cover non-exclusive inclusion. For example, a process, a method, a system, a product, or an electronic device that includes a series of steps or units is not limited to listed steps or units, but optionally includes unlisted steps or units, or optionally includes other steps or units inherent to the process, the method, the product, or the electronic device. The reference to "embodiment" in the present disclosure means that specific features, structures, or characteristics described in combination with the embodiment may be included in at least one embodiment of the present disclosure. The phrase displayed in various positions in the specification does not necessarily refer to the same embodiment, nor is it an independent or alternative embodiment that is mutually exclusive with other embodiments. Those skilled in the art explicitly and implicitly understand that an embodiment described in the present disclosure can be combined with other embodiments. The term "and/or" used in the specification of the present disclosure and the accompanying claims refers to any combination and all possible combinations of one or more of related listed items, and includes these combinations.

Those ordinary skilled in the art may realize that units and algorithm steps of each example described in combination with the embodiments disclosed in present disclosure can be implemented by means of electronic hardware, computer software, or a combination of both. In order to clearly illustrate the interchangeability of hardware and software, composition and steps of each example have been described in general terms according to their functions in the above description. Those professional skilled may use different methods to implement the described functions for each specific application, but such implementation should not be considered beyond the scope of the present disclosure.

The above disclosure is only a preferred embodiment of the present disclosure, and cannot be used to limit the scope of claims in the present disclosure. Therefore, equivalent changes made according to claims the present disclosure still fall within the scope of the present disclosure.

What is claimed is:

1. A communication method, performed by a sending device, comprising:

receiving first information, wherein the first information comprises at least one piece of first signal information, and the one piece of first signal information is signal information acquired by one first device;

determining idle channels based on the at least one piece of first signal information;

randomly selecting one channel from the idle channels;

determining the channel selected as a target channel in response to the channel selected being unoccupied; and sending information based on the target channel.

2. The method according to claim 1, further comprising:

obtaining position information of a first device corresponding to each piece of first signal information;

wherein determining the idle channels based on the at least one piece of first signal information comprises:

determining target signal information from the at least one piece of first signal information based on position information of the sending device and position information of each first device; and determining the idle channels based on the target signal information.

3. The method according to claim 2, wherein the first information further comprises the position information of the first device corresponding to each piece of first signal information.

4. The method according to claim 1, wherein receiving the first information comprises:

receiving broadcast information carrying the first information.

5. The method according to claim 1, wherein receiving the first information comprises any one of:

receiving the first information sent by at least one first device; or receiving the first information sent by a second device, wherein the first information is sent by the at least one first device to the second device.

6. The method according to claim 5, wherein receiving the first information sent by the at least one first device comprises:

receiving broadcast information sent by each of the at least one first device through a broadcast subchannel corresponding to each first device, wherein the broadcast information carries the first information.

7. The method according to claim 5, wherein receiving the first information sent by the at least one first device comprises at least one of:

receiving the first information sent by the at least one first device through a broadcast channel, wherein the broadcast channel is a broadcast channel for sending the first information and corresponding to all first devices; or receiving the first information sent by each of the at least one first device through a broadcast subchannel corresponding to each of the at least one first device.

8. The method according to claim 7, wherein receiving the first information sent by each of the at least one first device through the broadcast subchannel corresponding to each of the at least one first device comprises:

obtaining position information corresponding to each first device;

determining at least one target first device based on position information of the sending device and the position information corresponding to each first device; and receiving the first information sent by each of the at least one target first device based on a broadcast subchannel corresponding to each of the at least one target first device determined.

9. The method according to claim 1, further comprising:

receiving second information in response to the channel selected being occupied, wherein the second information comprises at least one piece of second signal information, one second signal information is signal information acquired by one first device;

determining an idle channel based on at least one second signal information; and sending the information based on the idle channel.

10. The method according to claim 1, further comprising:

re-selecting one channel from the idle channels other than the channel selected, in response to the channel selected being occupied;

wherein sending the information based on the idle channels comprises:

sending the information based on the channel re-selected.

11. The method according to claim 1, wherein the first signal information comprises at least one of:

a signal strength, a signal type, and a signal feature of a signal.

12. A sending device, comprising a processor and a memory, coupled with each other, wherein:

the memory is configured to store a computer program; and the processor is configured to implement the method of according to claim 1 when calling the computer program.

13. A communication method, performed by a first device, comprising:

acquiring first signal information, wherein the first signal information is configured for a sending device to determine idle channels, one channel is randomly selected from the idle channels by the sending device, the channel selected is determined as a target channel by the sending device in response to the channel selected being unoccupied, and the target channel is configured for the sending device to send information; and sending first information comprising the first signal information.

14. A first device, comprising a processor and a memory, coupled with each other, wherein:

the memory is configured to store a computer program; and the processor is configured to implement the method according to claim 13 when calling the computer program.

15. A communication method, performed by a second device, comprising:

obtaining third information sent by at least one first device, wherein the third information comprises first signal information, the first signal information is signal information acquired by the first device, and configured for a sending device to determine idle channels, one channel is randomly selected from the idle channels by the sending device, the channel selected is determined as a target channel by the sending device in response to the channel selected being unoccupied, and the target channel is configured for the sending device to send information; and sending first information comprising at least one piece of first signal information.

16. A second device, comprising a processor and a memory, coupled with each other, wherein:

the memory is configured to store a computer program; and the processor is configured to implement the method according to claim 15 when calling the computer program.

* * * * *